United States Patent
Sato et al.

(10) Patent No.: US 12,217,501 B2
(45) Date of Patent: Feb. 4, 2025

(54) IDENTIFICATION APPARATUS, OBJECT IDENTIFICATION METHOD, LEARNING APPARATUS, LEARNING METHOD, AND RECORDING MEDIUM

(71) Applicant: NEC Corporation, Tokyo (JP)

(72) Inventors: Hideaki Sato, Tokyo (JP); Katsumi Kikuchi, Tokyo (JP); Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 328 days.

(21) Appl. No.: 17/783,429

(22) PCT Filed: Dec. 24, 2019

(86) PCT No.: PCT/JP2019/050615
§ 371 (c)(1),
(2) Date: Jun. 8, 2022

(87) PCT Pub. No.: WO2021/130856
PCT Pub. Date: Jul. 1, 2021

(65) Prior Publication Data
US 2022/0392212 A1  Dec. 8, 2022

(51) Int. Cl.
*G06V 20/17* (2022.01)
*G06T 7/11* (2017.01)
(Continued)

(52) U.S. Cl.
CPC ............... *G06V 20/17* (2022.01); *G06T 7/11* (2017.01); *G06T 7/194* (2017.01); *G06V 10/774* (2022.01);
(Continued)

(58) Field of Classification Search
CPC .......... G06N 3/08; G06N 3/045; G06N 20/00; G06T 2207/20084; G06T 7/11;
(Continued)

(56) References Cited

U.S. PATENT DOCUMENTS 8,311,281 B2 * 11/2012 Ikeda ...................... G06T 7/143
348/135
10,275,709 B2 * 4/2019 Munteanu ................ G06N 3/08
(Continued)

FOREIGN PATENT DOCUMENTS

| JP | 2001-307106 A | 11/2001 | |
|---|---|---|---|
| JP | 2013065118 A * | 4/2013 | ......... G06K 9/00228 |
| JP | 2014-178736 A | 9/2014 | |

OTHER PUBLICATIONS

Machine translation obtained from google patents of JP-2013065118-A (Year: 2013).*
(Continued)

Primary Examiner — Aaron W Carter
Assistant Examiner — Courtney Joan Nelson

(57) ABSTRACT

In an object identification apparatus, a foreground extraction unit performs a foreground extraction with respect to input images, and generates a foreground extraction result. A state extraction unit extracts a state for each foreground based on the foreground extraction result. An identification model selection unit selects one or more identification models based on the extracted state for each foreground by using a selection model. An identification unit identifies a moving object included in the input images using the selected identification model.

16 Claims, 10 Drawing Sheets

(51) Int. Cl.
*G06T 7/194* (2017.01)
*G06V 10/774* (2022.01)

(52) U.S. Cl.
CPC ............... *G06T 2207/10032* (2013.01); *G06T 2207/20081* (2013.01)

(58) Field of Classification Search
CPC . G06T 2207/20081; G06T 7/194; G06T 5/50; G06T 2207/10016; G06T 7/73; G06T 7/20; G06T 7/00; G06T 7/10; G06T 7/13; G06T 7/246; G06T 7/70; G06T 7/0008; G06T 7/254; G06T 7/337; G06T 2207/30241; G06T 2210/12; G06T 2207/10032; G06V 10/82; G06V 10/25; G06V 10/40; G06V 20/52; G06V 2201/07; G06V 10/764; G06V 10/44; G06V 10/7715; G06V 40/16; G06V 40/10; G06V 20/17; G06V 10/774; G06F 18/24; G06F 18/214
See application file for complete search history.

(56) References Cited

U.S. PATENT DOCUMENTS

| | | | | |
|---|---|---|---|---|
| 10,839,228 | B2* | 11/2020 | Danielsson | G06V 40/25 |
| 2009/0169067 | A1* | 7/2009 | Chang | G06V 40/173 |
| | | | | 382/118 |
| 2011/0044536 | A1* | 2/2011 | Cobb | G06V 10/507 |
| | | | | 382/165 |
| 2013/0070973 | A1 | 3/2013 | Saito et al. | |
| 2014/0270548 | A1* | 9/2014 | Kamiya | G06V 10/87 |
| | | | | 382/224 |
| 2019/0066313 | A1* | 2/2019 | Kim | G06V 10/255 |
| 2020/0143561 | A1* | 5/2020 | Hallett | G06T 7/13 |

OTHER PUBLICATIONS

International Search Report for PCT Application No. PCT/JP2019/050615, mailed on Feb. 25, 2020.

* cited by examiner (AT SELECTION OF IDENTIFICATION MODEL)

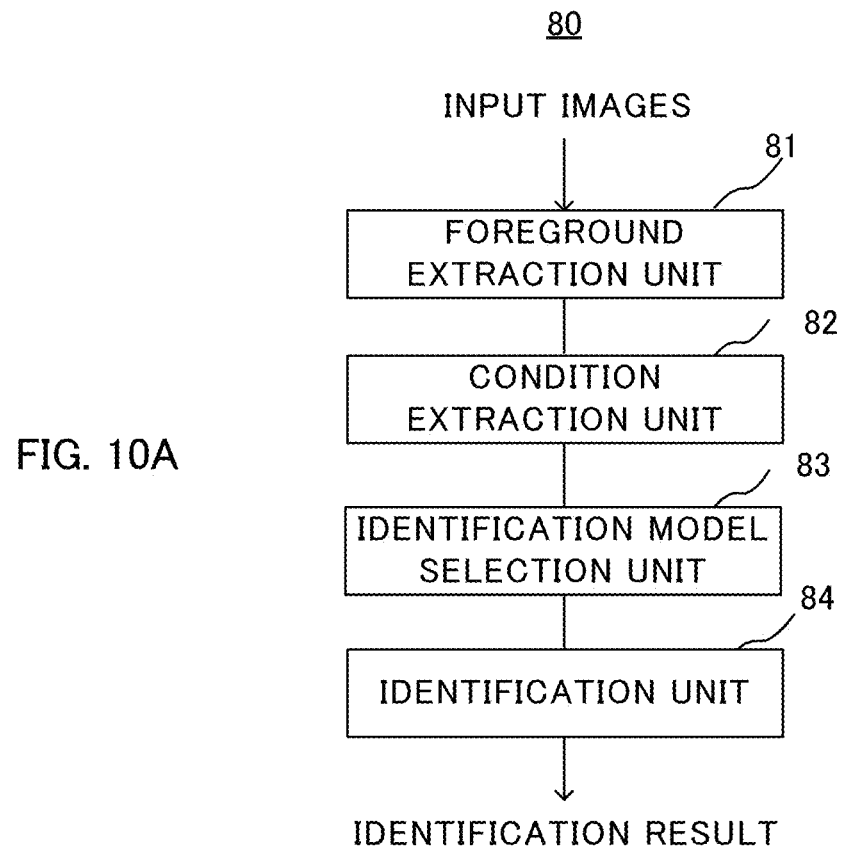
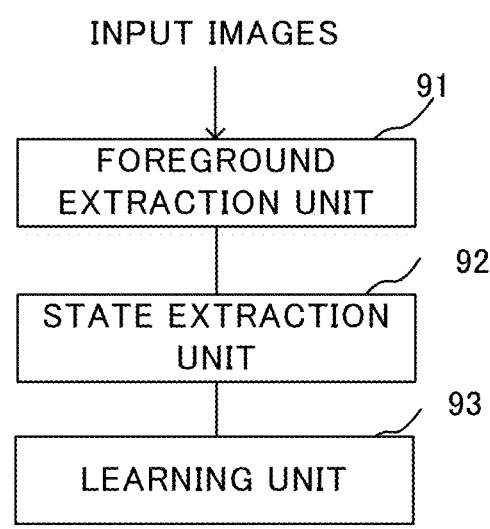
FIG. 10A
FIG. 10B

IDENTIFICATION APPARATUS, OBJECT IDENTIFICATION METHOD, LEARNING APPARATUS, LEARNING METHOD, AND RECORDING MEDIUM

This application is a National Stage Entry of PCT/JP2019/050615 filed on Dec. 24, 2019, the contents of all of which are incorporated herein by reference, in their entirety.

TECHNICAL FIELD

The present disclosure relates to a technique for identifying objects included in an image.

BACKGROUND ART

In recent years, drones have been utilized for various applications. In a case where the drones have become popularly used, it is considered that an air traffic control of the drones will be necessary. For example, it is necessary to monitor surroundings of the drones to be managed using images taken by cameras installed on the ground. Specifically, in an aviation control work of drones, it is necessary to detect small moving objects based on captured images, to identify uncontrollable objects such as birds and drones other than managed drones, and to automatically perform collision avoidance by immediately controlling the drones to be managed. Accordingly, it is necessary to identify a type of a flying object in a vicinity of the drone to be managed.

Patent Document 1 describes a method for extracting a target object from an aerial image, and describes a method for selecting an optimal extraction means for extracting the target object according to a type of the target object.

PRECEDING TECHNICAL REFERENCES

Patent Document

Japanese Laid-open Patent Publication No. 2001-307106

SUMMARY

Problem to be Solved by the Invention

Patent Document 1 described above uses an optimal extraction method for each type of target objects; however, it is conceivable that extraction accuracy is reduced in a case where a flight state or the like is different even for the target of the same type.

It is an object of the present invention to accurately identify each moving object included in an image.

Means for Solving the Problem

According to an example aspect of the present disclosure, there is provided an object identification apparatus including:
a foreground extraction unit configured to perform a foreground extraction with respect to input images, and generate a foreground extraction result;
a state extraction unit configured to extract a state of each foreground based on the foreground extraction result;
an identification model selection unit configured to select one or more identification models based on the extracted state by using a selection model; and
an identification unit configured to identify a moving object included in the input images by using the selected one or more identification models.

According to another example aspect of the present disclosure, there is provided an object identification method including:
generating a foreground extract result by performing a foreground extraction with respect to input images;
extracting a state of each foreground based on the foreground extraction result;
selecting one or more identification models based on the extracted state by using a selection model; and
identifying a moving object included in the input images by using the selected one or more identification models.

According to still another example aspect of the present disclosure, there is provided a recording medium storing a program, the program causing a computer to perform a process including:
generating a foreground extract result by performing a foreground extraction with respect to input images;
extracting a state of each foreground based on the foreground extraction result;
selecting one or more identification models based on the extracted state by using a selection model; and
identifying a moving object included in the input images by using the selected one or more identification models.

According to a further example aspect of the present disclosure, there is provided a learning apparatus including:
a foreground extraction unit configured to perform a foreground extraction with respect to input images, and generate a foreground extraction result;
a state extraction unit configured to extract a state for each foreground by using the foreground extraction result; and
a learning unit configured to train a selection model for selecting one or more identification models of an object based on the state for each foreground and correct answer data prepared in advance.

According to still further example aspect of the present disclosure, there is provided a learning method including:
performing a foreground extraction with respect to input images, and generate a foreground extraction result;
extracting a state for each foreground by using the foreground extraction result; and
training a selection model for selecting one or more identification models of an object based on the state for each foreground and correct answer data prepared in advance.

According to yet further example aspect of the present disclosure, there is provided a recording medium storing a program, the program causing a computer to perform a process including:
performing a foreground extraction with respect to input images, and generate a foreground result;
extracting a state for each foreground by using the foreground extraction result; and
training a selection model for selecting one or more identification models of an object based on the state for each foreground and correct answer data prepared in advance.

Effect of the Invention

According to the present disclosure, it is possible to accurately identify each moving object included in an image.

BRIEF DESCRIPTION OF THE DRAWINGS

FIG. 10 illustrates a configuration of an object identification apparatus and a learning apparatus according to a second example embodiment.

EXAMPLE EMBODIMENTS

In the following, example embodiments will be described with reference to the accompanying drawings.

<Basic Concept>

First, a basic concept of an object identification method according to example embodiments will be described. Here, considering identifying movement objects in the flight from an image where sky is captured. In a case where a size of a moving object is small, since an appearance of a moving object in the captured image is hardly changed, accuracy is reduced when focusing on and identifying the appearance of the moving object. Accordingly, in this case, it is preferable to perform an identification by paying attention to a behavior and a movement trajectory of the moving object. On the other hand, in a case where the size of the moving object is large, it becomes possible to identify with a certain degree of accuracy when attention is paid to an appearance of the moving object. Accordingly, it is necessary to select an identification method, that is, an identification model to be used, in accordance with a state of the moving object in the captured image. The following example embodiments provide a method for appropriately selecting the identification model in accordance with the state of the moving object.

First Example Embodiment (Hardware Configuration)

Figure 1:
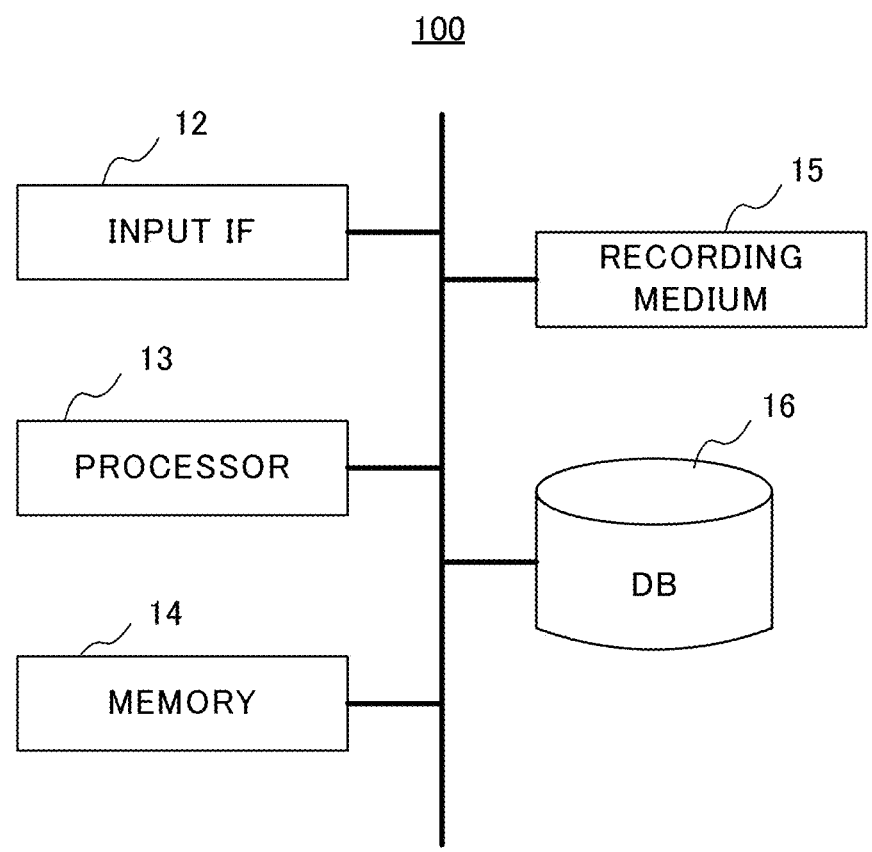
FIG. 1 illustrates a hardware of a foreground extraction apparatus according to example embodiments.

FIG. 1 is a block diagram illustrating a hardware configuration of an object identification apparatus according to a first example embodiment. As illustrated, an object identification apparatus 100 includes an input IF (InterFace) 12, a processor 13, a memory 14, a recording medium 15, and a database (DB) 16.

The input IF 12 acquires an input image to be processed by the object identification apparatus 100. For instance, images capturing moving objects flying in the sky are entered through the input IF 12 by cameras installed on the ground. The processor 13 is a computer such as a CPU (Central Processing Unit) and controls the entire object identification apparatus 100 by executing programs prepared in advance. Specifically, the processor 13 executes a learning process and an object identification process to be described later.

The memory 14 is formed by a ROM (Read Only Memory), a RAM (Random Access Memory), or the like. The memory 14 stores various programs to be executed by the processor 13. The memory 14 is also used as a working memory during executions of various processes by the processor 13.

The recording medium 15 is a non-volatile and non-transitory recording medium such as a disk-shaped recording medium, a semiconductor memory, or the like, and is formed to be detachable from the object identification apparatus 100. The recording medium 15 records various programs executed by the processor 13. When the object identification apparatus 100 executes various kinds of processes, programs recorded on the recording medium 15 are loaded into the memory 14 and executed by the processor 13.

The database 16 stores data input from an external apparatus. Specifically, each input image to be processed by the object identification apparatus 100 is stored. In addition to the above, the object identification apparatus 100 may include an input device such as a keyboard or a mouse for a user to perform instructions or inputs, or a display unit.

(Functional Configuration)

Figure 2:
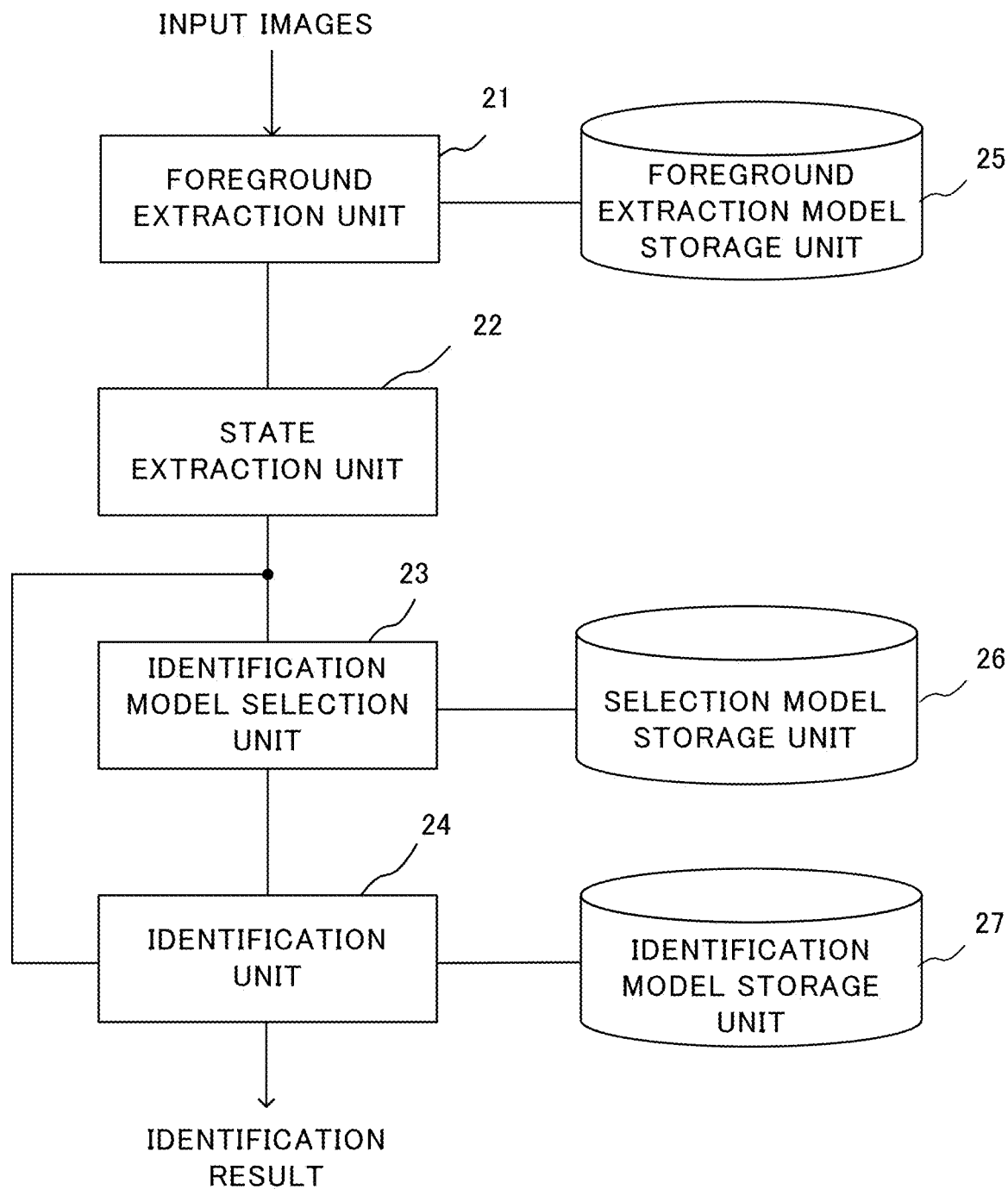
FIG. 2 illustrates a functional configuration of an object identification apparatus according to a first example embodiment.

FIG. 2 is a block diagram illustrating a functional configuration of the object identification apparatus 100 according to the first example embodiment. As illustrated, the object identification apparatus 100 includes a foreground extraction unit 21, a state extraction unit 22, an identification model selection unit 23, an identification unit 24, a foreground extraction model storage unit 25, a selection model storage unit 26, and an identification model storage unit 27.

The foreground extraction unit 21 extracts each foreground from each input image. The foreground is a portion other than a background in the input image, and is a region corresponding to a moving object to be identified. The foreground extraction model storage unit 25 stores a plurality of foreground extraction models for extracting foregrounds from the input image. The foreground extraction unit 21 acquires a foreground extraction model from the foreground extraction model storage unit 25, and extracts each foreground from the input image.

Figure 3:
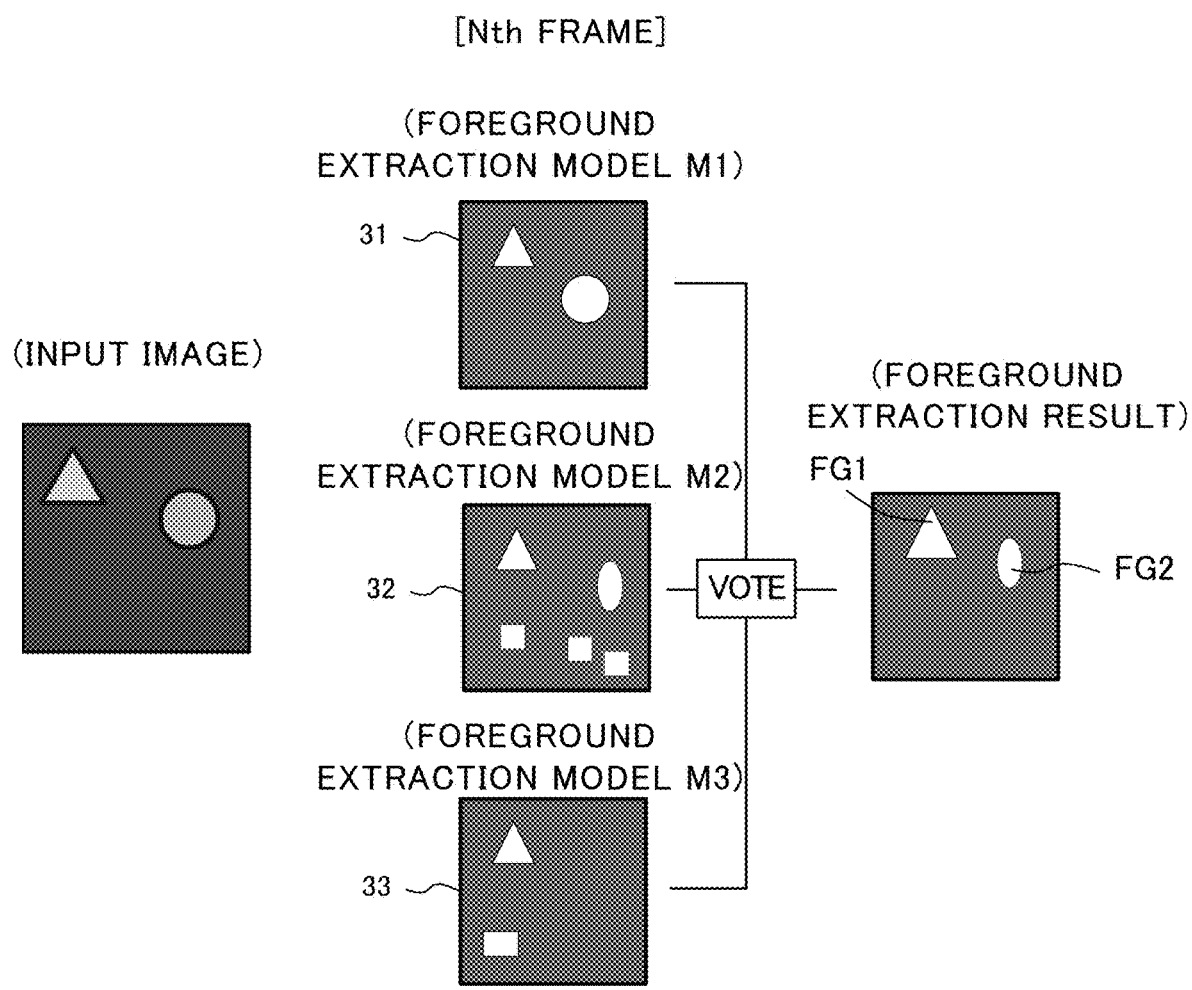
FIG. 3 is a diagram for explaining an example of a foreground extraction method.

FIG. 3 is a diagram illustrating an example of the foreground extraction method. The foreground extraction unit 21 obtains a foreground extraction result by applying a plurality of foreground extraction models to an input image. In an example of FIG. 3, the foreground extraction unit 21 applies foreground extraction models M1 through M3 to the input image, and outputs one foreground extraction result by voting on respective foreground extraction results 31 through 33 obtained by the foreground extraction unit 21. The vote here is based on a majority. That is, the foreground extraction unit 21 includes each foreground included in the majority of the respective foreground extraction results 31 through 33 in the foreground extraction result. In the example of FIG. 3, a foreground FG1 of a triangular shape included in all of the foreground extraction results 31 to 33 and a foreground FG2 of a circular shape (a circle and an ellipse respectively) included in the foreground extraction results 31 and 32 are extracted and output to the state extraction unit 22.

Figure 4A:
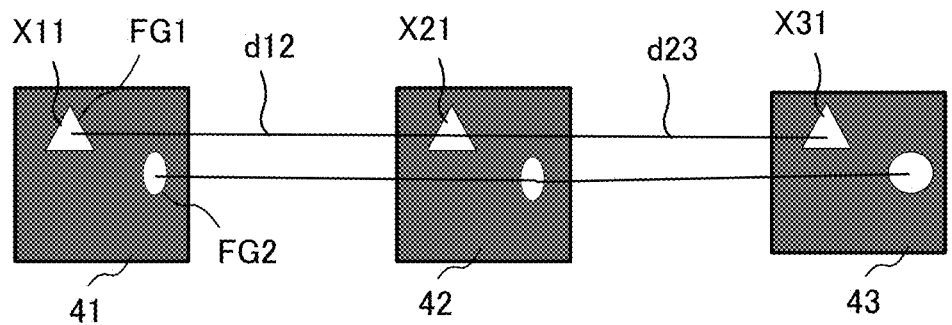
FIG. 4 is a diagram for explaining a method for extracting a movement trajectory features and an area variation features from foregrounds.

The state extraction unit 22 extracts each state of the foregrounds based on the one foreground extraction result. Here, the "state" includes a movement trajectory feature, an area variation feature, and an appearance feature of the foreground. Specifically, the state extraction unit 22 first tracks a foreground using foreground extraction results corresponding to a plurality of adjacent frames (N frames) in input images. FIG. 4A is a diagram for explaining tracking of the foreground. In this example, three frames are used. The state extraction unit 22 tracks the same foreground in three foreground extraction results 41 through 43 obtained from the first to third frames. In an example of FIG. 4A, the state extraction unit 22 tracks the foreground FG1 of the triangle in each of three foreground extraction results 41 through 43, and generates correspondence relationships for the foreground FG1 among three frames. The state extraction unit 22 also tracks the foreground FG2 being circular in the same manner.

Next, the state extraction unit 22 extracts the movement trajectory feature based on a tracking result of the foreground. Specifically, the state extraction unit 22 acquires coordinates of the foreground for each frame and a movement amount of the foreground among adjacent frames. In the example of FIG. 4A, the state extraction unit 22 acquires coordinates X11, X21, and X31 of the foreground FG1 respectively in the adjacent frames, a movement amount d12 of the foreground FG1 between the first frame and the second frame, and a movement amount d23 of the foreground FG1 between the second frame and the third frame. After that, the state extraction unit 22 generates the following movement trajectory feature:

Movement trajectory feature: $T1=\{X11, X21, X31, d12, d23\}$.

The state extraction unit 22 similarly generates a movement trajectory feature T2 of the foreground FG2.

Figure 4B:
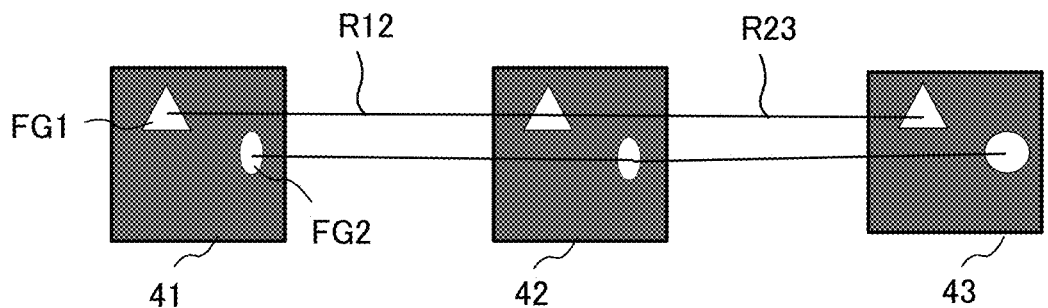

Next, the state extraction unit 22 extracts an area variation feature. The area variation feature indicates a variation ratio for an area of the foreground among the adjacent frames. FIG. 4B is a diagram for explaining a method for extracting the area variation feature. The state extraction unit 22 calculates the area of the foreground in the foreground extraction results 41 through 43 of the first frame to the third frame, and obtains the area variation feature as follows:

Area variation feature: $\text{Area}=\{R12, R23\}$

Here, an "R" denotes an area variation of a foreground, and an "R12" denotes a ratio of an area in the first frame to another area in the second frame, regarding a certain foreground. For instance, in a case where S1 denotes the area in the first frame for the foreground FG1 and S2 denotes the area in the second frame, the ratio is represented by R=S1/S2. In this manner, the state extraction unit 22 extracts respective area variation features Area for all foregrounds included in the foreground extraction result.

Figure 5:
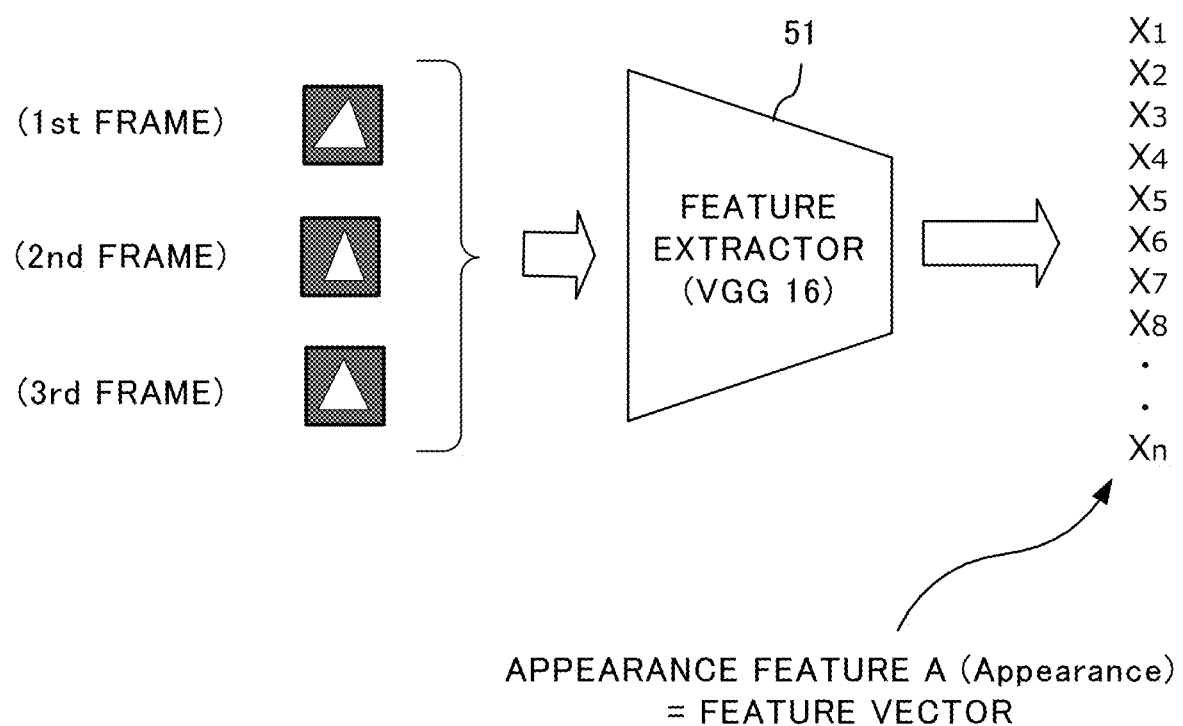
FIG. 5 is a diagram for explaining a method for extracting appearance features from the foregrounds.

Moreover, the state extraction unit 22 extracts each appearance feature. The appearance feature refers to a feature of an appearance for each foreground in input images. FIG. 5 is a diagram for explaining a method for extracting the appearance feature. The state extraction unit 22 extracts each appearance feature by using a feature extractor 51 including a neural network. Here, the feature extractor 51 may be any feature extractor used in a general object recognition, and for instance, a VGG16, a ResNet, or the like can be used. Note that the feature extractor 51 has already been trained.

Specifically, the state extraction unit 22 cuts out foreground areas from input images based on respective foreground extraction results of frames generated by the foreground extraction unit 21. In the example of FIG. 4, the state extraction unit 22 cuts out areas of the foreground FG1 from images of the first to third frames, and inputs the areas to the feature extractor 51. That is, temporal change images associated with the foreground areas by the above-described tracking are input to the feature extractor 51. The feature extractor 51 extracts features of the foreground from the temporal change images of the input foreground regions, and outputs a feature vector. The state extraction unit 22 uses the output feature vector as an appearance feature A. The state extraction unit 22 outputs respective appearance features A for all foregrounds included in the foreground extraction result.

Accordingly, the state extraction unit 22 extracts the state for each of foregrounds, which includes the movement trajectory feature, the area variation feature, and the appearance feature, based on respective foreground extraction results for N frames generated by the foreground extraction unit 21. The identification model selection unit 23 selects an identification model for identifying an object based on the state extracted by the state extraction unit 22. The identification model storage unit 27 stores a plurality of identification models for identifying objects. However, as described above, the identification model to be used differs depending on a foreground situation in the input images. Therefore, in the present disclosure, the identification model selection unit 23 selects one or more appropriate identification models from a plurality of identification models prepared in advance.

Specifically, the selection model storage unit 26 stores, from among the plurality of identification models, a selection model that is a model for selecting an appropriate identification model in accordance with a state at that time. The identification model selection unit 23 acquires the selection model from the selection model storage unit 26, and uses the selection model to select an identification model suitable for the state of the foreground. Incidentally, in the selection model storage unit 26, a previously learned selection model is stored.

Figure 6:
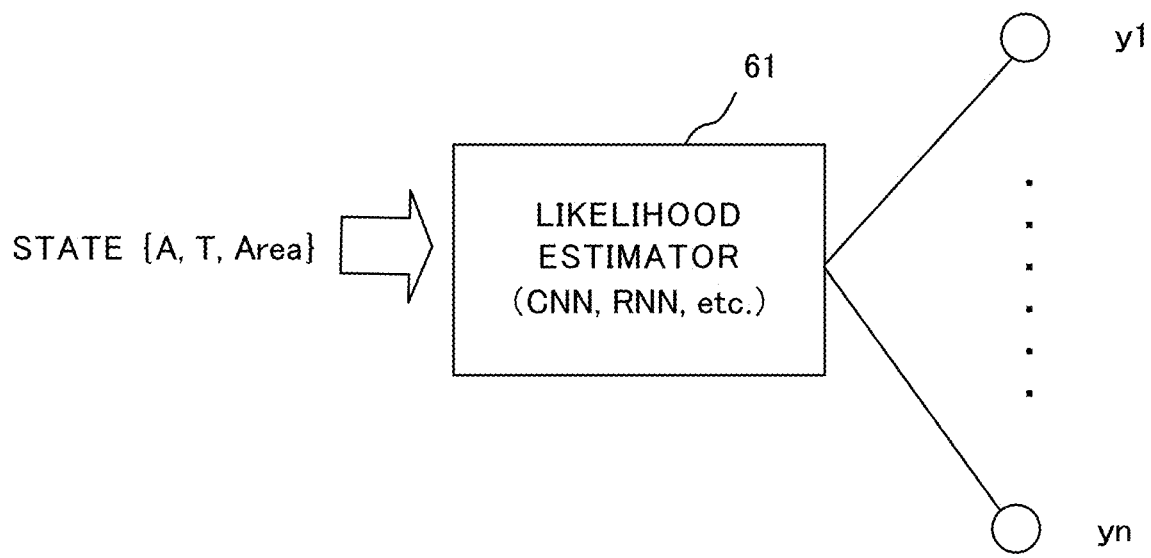
FIG. 6 illustrates an example of a configuration of an identification model selection unit.

FIG. 6 illustrates an example of a configuration of the identification model selection unit 23. In this example, a likelihood estimator 61 is used as the selection model. As illustrated in FIG. 6, when the identification model is selected by the identification model selection unit 23, a state extracted by the state extraction unit 22 is input to the likelihood estimator 61. As described above, the state includes a visible feature A, a movement trajectory feature T, and an area variation feature Area. The likelihood estimator 61 is formed by a neural network, and for instance, a CNN (Convolutional Neural Network), a RNN (Recurrent Neural Network), or the like can be used. The likelihood estimator 61 learns the likelihood for selecting a plurality of identification models based on an input state. In an example of FIG. 6, the likelihood estimator 61 generates the likelihood y1 through yn in order to select respective models for the identification models 1 to N, and outputs the likelihood y1 through yn to the identification unit 24 as a selection result.

The identification unit 24 acquires an identification model to be used from the identification model storage unit 27 based on the selection result input from the identification model selection unit 23. Moreover, the identification unit 24 acquires the extracted state, that is, the movement trajectory feature T, the area variation feature Area, and the appearance feature A from the state extraction unit 22. After that, the identification unit 24 identifies an object from the state using the acquired identification model.

As one example, the identification unit 24 identifies an object using one identification model having the highest likelihood output from the identification model selection unit 23. In another example, the identification unit 24 may identify an object using a predetermined number of identification models which likelihood output by the identification model selection unit 23 is higher. In a still another example, the identification unit 24 may use the likelihoods output from the identification model selection unit 23 as weights in order to select respective identification models, and may obtain a final identification result by weighting the identification result acquired by each of the identification models. For instance, assume that the likelihood y1 output from the likelihood estimator 61 indicates "0.5", the likelihood y2 indicates "0.3", the likelihood y3 indicates "0.2", and the likelihood y4 to yn indicate all "0". In this case, the identification unit 24 may calculate the final identification result by weighting and adding identification results respectively with a weight "0.5" for the identification result of an identification model 1, a weight "0.3" for the identification result of an identification model 2, and a weight "0.2" for the identification result of an identification model 3.

The plurality of identification models for identifying an object are prepared in the identification model storage unit 27; however, all the identification models do not always use three features (that is, the movement trajectory feature T, the area variation feature Area, and the appearance feature A) included in the state in order to identify the object. That is, one identification model may be a model that uses only the appearance feature A, and another identification model may be a model that uses the movement trajectory feature T and the area variation feature Area. In this case, when the identification model selected by the identification model selection unit 23 is used, the identification unit 24 identifies an object after specifying a feature which the identification model uses as an input. As one method for this manner, the identification unit 24 may prepare a function representing which feature is used as an input for each of a plurality of prepared identification models, and may use this function to specify the feature which each of the prepared identification models uses. Specifically, as follows, the identification unit 24 may use an ID "m" of an identification model as an input, and F(m) is used as a function for outputting one or more features which the identification model uses from among three states.

$$F(m)=\{A,T,\text{Area}\}$$

For instance, in a case where F(1)={1, 1, 0} is acquired, this represents that the identification model 1 uses the appearance feature A and the movement trajectory feature T as inputs.

In a case where a plurality of foregrounds are included in an input image, the state extraction unit 22 extracts a state for each of the foregrounds, and the identification model selection unit 23 selects an identification model for each of the foregrounds. Accordingly, the identification unit 24 can identify an object using an optimal identification model for each of the foregrounds.

(Object Identification Process)

Figure 7:
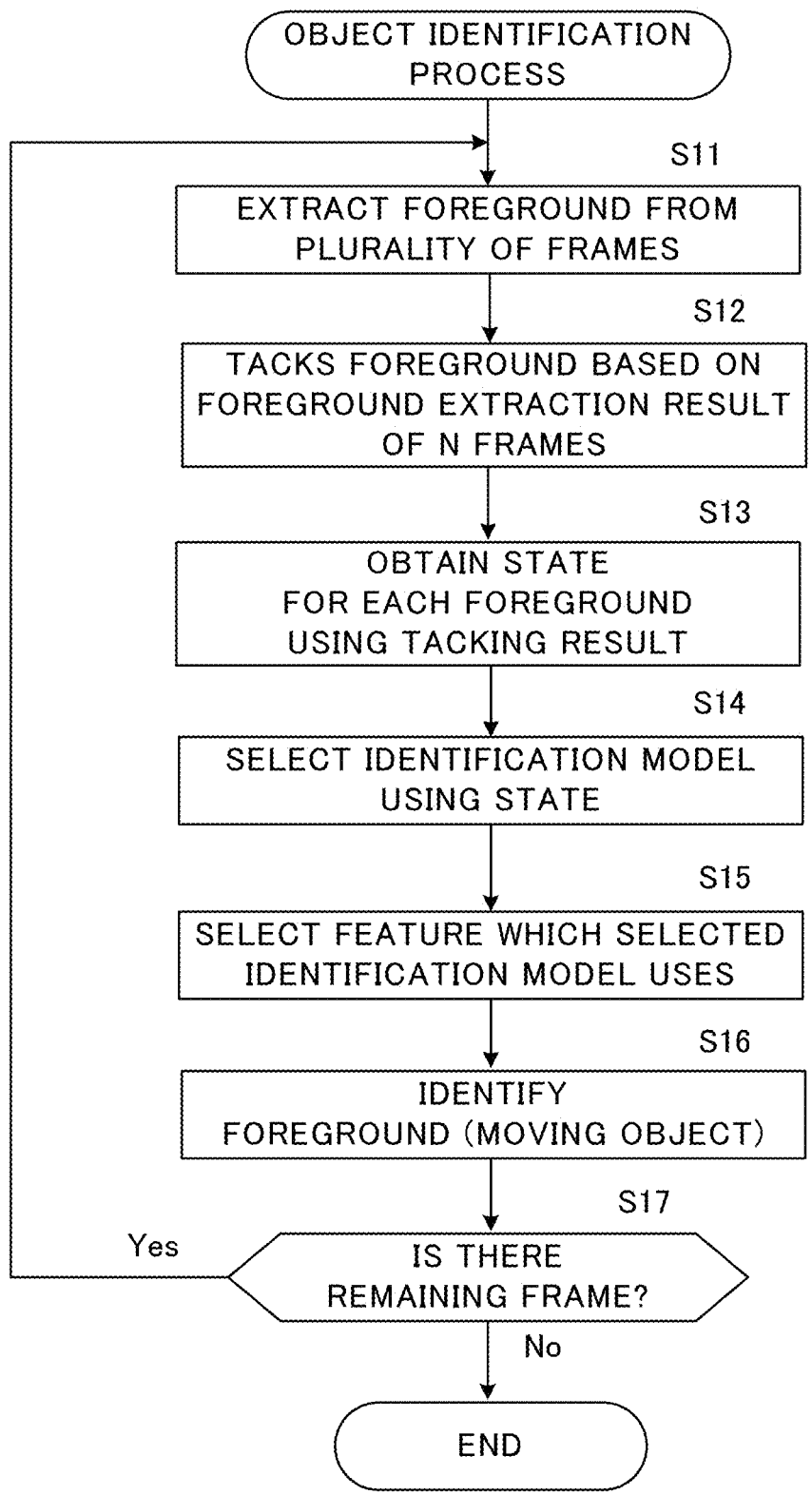
FIG. 7 is a flowchart of an object identification process.

FIG. 7 is a flowchart of an object identification process performed by the object identification apparatus 100. This process is realized by the processor 13 illustrated in FIG. 1, which executes a program prepared in advance and operates as each element illustrated in FIG. 2.

First, the foreground extraction unit 21 extracts each foreground from a plurality of frames for input images (step S11). Specifically, the foreground extraction unit 21 acquires a foreground extraction model from the foreground extraction model storage unit 25, and extracts each foreground. The foreground extraction result is input to the state extraction unit 22.

Next, the state extraction unit 22 tracks each foreground included in the foreground extraction result of N frames (step S12), and obtains a state for each foreground using a tracking result (step S13). Specifically, the state extraction unit 22 extracts the state including the movement trajectory feature T, the area variation feature Area, and the appearance feature A for each foreground. The extracted state is input to the identification model selection unit 23 and the identification unit 24.

Next, the identification model selection unit 23 acquires a selection model from the selection model storage unit 26, and selects the identification model based on the state input from the state extraction unit 22 using the selection model (step S14). Next, the identification unit 24 specifies features to be used as inputs with respect to one or more identification models selected using the selection model (step S15). This selection is performed, for instance, using the function F(m) described above. After that, the identification unit 14 identifies a foreground, that is, a moving object, from the features selected in step S15 using the one or more identification models selected in step S14 (step S16).

Next, the object identification apparatus 100 determines whether or not there is a remaining frame in the input images (step S17). When there is the remaining frame (step S17: Yes), the process goes back to step S11, and processes of steps S11 through S16 are performed for a next frame set. For instance, when an object identification is performed using three adjacent frames as described above, the object identification apparatus 100 first performs the processes of steps S11 through S16 using the first to third frames as one frame set, and subsequently performs the processes of steps S11 through S16 using the second to fourth frames as one frame set by shifting one frame. On the other hand, when there is no remaining frame (step S17: No), this object identification process is terminated.

(Learning a Selection Model)

Next, the learning of the selection model will be described. In the object identification apparatus 100 described above, a selection model that has already been learned is stored in the selection model storage unit 26, and the identification model selection unit 23 selects the identification model using the selection model. The learning of the selection model will be described below.

Figure 8A:
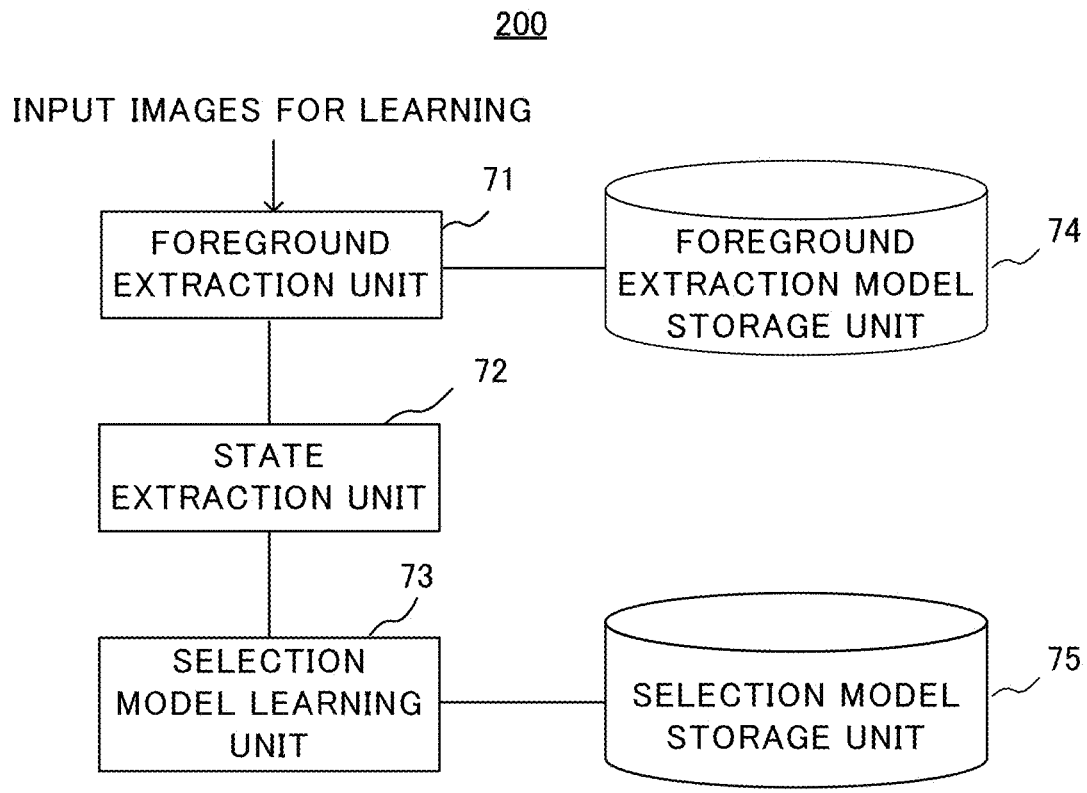
FIG. 8 is a configuration of a selection model training apparatus.

FIG. 8A is a block diagram illustrating a configuration of a selection model learning apparatus 200. The selection model learning apparatus 200 includes a foreground extraction unit 71, a state extraction unit 72, a selection model learning unit 73, a foreground extraction model storage unit 74, and a selection model storage unit 75. Incidentally, the foreground extraction unit 71, the state extraction unit 72, and the foreground extraction model storage unit 74 are basically the same as the foreground extraction unit 21, the state extraction unit 22, and the foreground extraction model storage unit 25 of the object identification apparatus 100 illustrated in FIG. 2. Note that input images for learning are input to the foreground extraction unit 71.

The foreground extraction unit 71 extracts each foreground from the input images for learning, and outputs the extracted foreground to the state extraction unit 72. The state extraction unit 72 extracts a state from the extracted foreground, and outputs the extracted state to the selection model learning unit 73. The selection model learning unit 73 trains the selection model based on the state extracted by the state extraction unit 72.

Figure 8B:
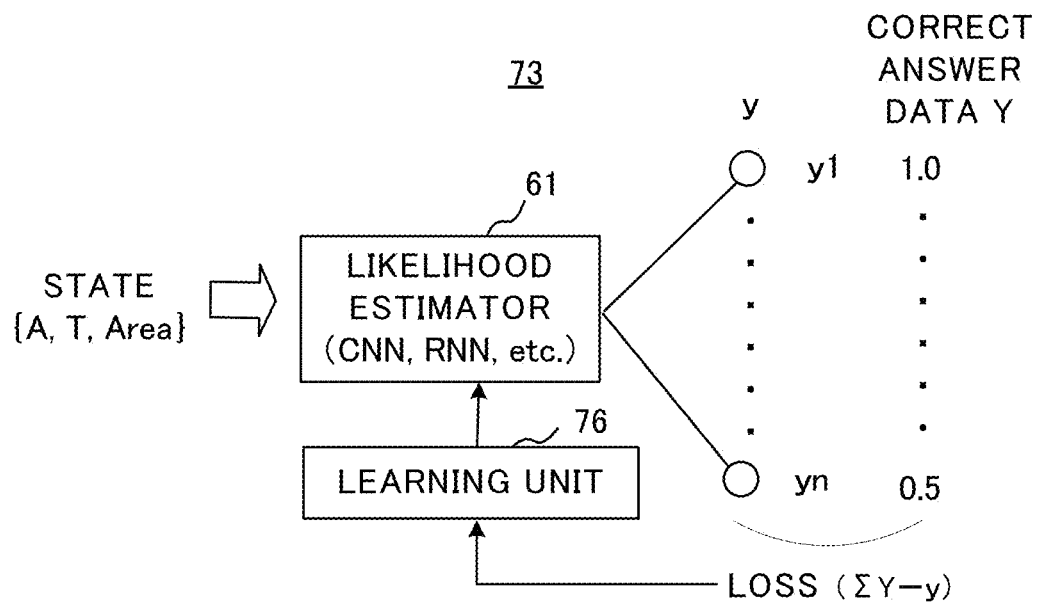

FIG. 8B is a block diagram illustrating a configuration of a selection model learning unit 73. The selection model learning unit 73 includes a likelihood estimator 61 using a selection model and a learning unit 76. A state extracted from the input image for learning is input to the likelihood estimator 61. The likelihood estimator 61 outputs respective likelihood y1 through yn of identification models 1 through N based on the input state. On the other hand, correct answer data Y are prepared for the input image for learning. Learning data are regarded as a value which illustrates an identification model suitable for identifying a foreground for each of foregrounds included in input images for learning. For instance, in a case where an identification model suitable for identifying a certain foreground (for instance, a bird) is the identification model 1, the correct answer data Y indicate that the value of the identification model 1 is "1" and the value of the other identification model is "0". In addition, in a case where it is preferable to use the identification model 1 and the identification model 2 at a ratio of 1:1 in order to identify a certain foreground, the correct answer data Y indicate that a value is "0.5" for the identification model 1, a value is "0.5" for the identification model 2, and a value is "0" for the other identification models.

The learning unit 76 optimizes the likelihood estimator 61 so that a sum of differences between the correct data Y and each of the likelihood y1 through yn output from the likelihood estimator 61 is made to be a loss and the loss is reduced. Then, the selection model learning unit 73 stores, as the trained selection model, parameters and the like of the likelihood estimator 61 at a time when a predetermined end condition is provided, in the selection model storage unit 26.

Figure 9:
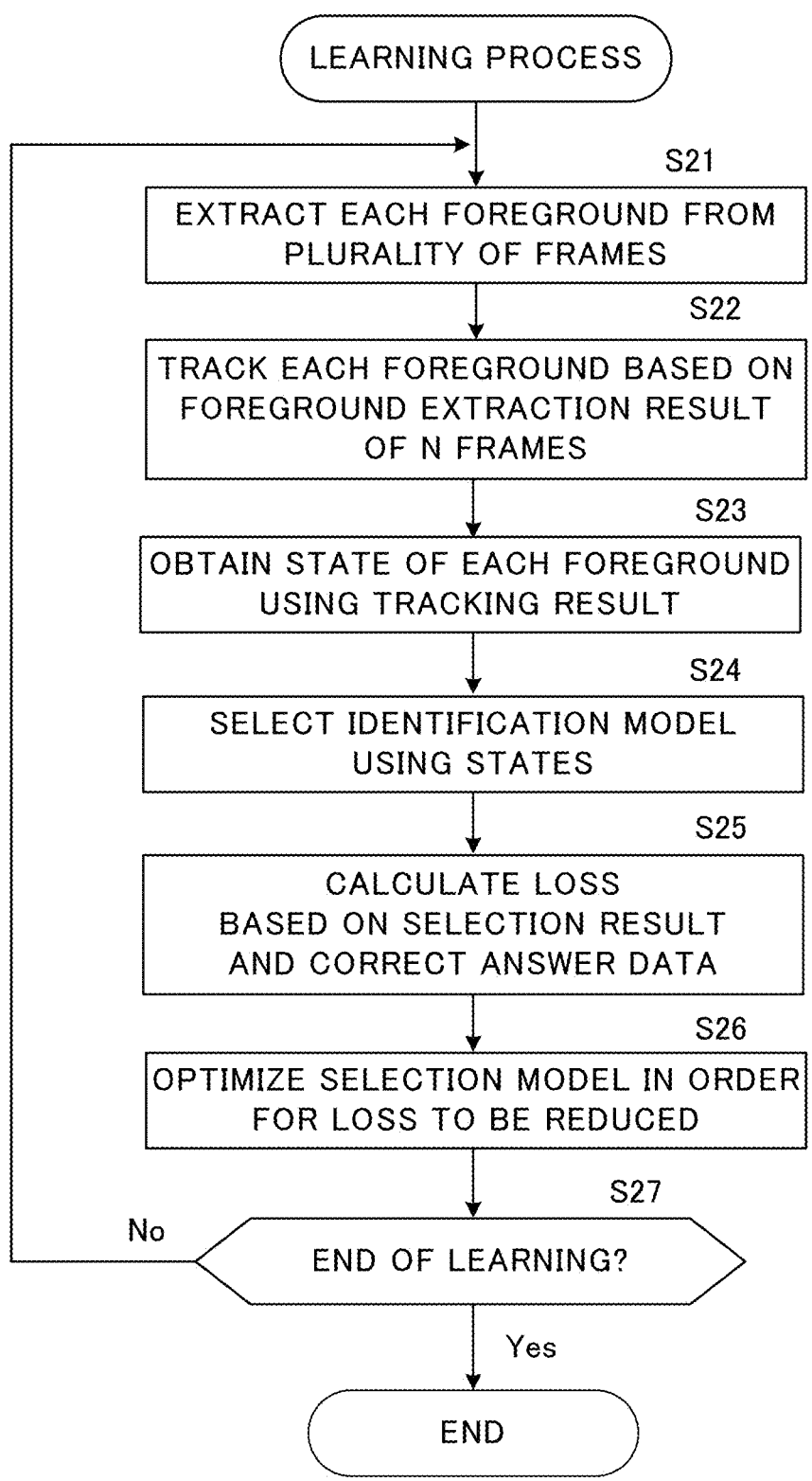
FIG. 9 is a flowchart of a learning process of a selection model.

FIG. 9 is a flowchart of the learning process of the selection model. This process is implemented by the processor 13 illustrated in FIG. 1, which executes a program prepared in advance. First, the foreground extraction unit 71 extracts the foreground from a plurality of frames for the input images (step S21). The foreground extraction result is input to the state extraction unit 72. Next, the state extraction unit 72 tracks each of foregrounds included in the foreground extraction result of the N frames (step S22), and obtains each state of the foregrounds using a tracking result (step S23). Specifically, the state extraction unit 22 extracts the state including the movement trajectory feature T, the area variation feature Area, and the appearance feature A for each of the foregrounds.

Next, the selection model learning unit 73 acquires the selection model from the selection model storage unit 75, and selects an identification model based on the state input from the state extraction unit 72 using the selection model (step S24). Subsequently, the selection model learning unit 73 calculates a loss between the correct data Y and the likelihood y which is regarded as the selection result, by the selection model (step S25), and optimizes the selection model so that the loss is reduced.

Next, the selection model learning apparatus 200 determines whether or not the learning has been completed, that is, whether or not the predetermined end condition has been provided (step S27). Until the end condition is provided, steps S21 to S26 are repeated using the input images for learning, and when the end condition is provided, the learning process is terminated.

Second Example Embodiment

FIG. 10A is a block diagram illustrating a configuration of an object identification apparatus according to a second example embodiment. The object identification apparatus 80 includes a foreground extraction unit 81, a state extraction unit 82, an identification model selection unit 83, and an identification unit 84. The foreground extraction unit 81 performs a foreground extraction with respect to input images to generate a foreground extraction result. The state extraction unit 82 extracts the state of each of the foregrounds based on the foreground extraction result. The identification model selection unit 83 selects one or more identification models based on the extracted states using the selection model. The identification unit 84 identifies a moving object included in the input images using the one or more selected identification model.

FIG. 10B is a block diagram illustrating a configuration of a learning apparatus according to the second example embodiment. A learning apparatus 90 includes a foreground extraction unit 91, a state extraction unit 92, and a learning unit 93. The foreground extraction unit 91 performs a foreground extraction with respect to input images to generate a foreground extraction result. The state extraction unit 92 extracts the state of the foreground using the foreground extraction result. The learning unit 93 trains a selection model for selecting an identification model of an object based on a state of a foreground and correct answer data prepared in advance.

A part or all of the example embodiments described above may also be described as the following supplementary notes, but not limited thereto.

(Supplementary Note 1)

1. An object identification apparatus comprising:
    a foreground extraction unit configured to perform a foreground extraction with respect to input images, and generate a foreground extraction result;
    a state extraction unit configured to extract a state of each foreground based on the foreground extraction result;
    an identification model selection unit configured to select one or more identification models based on the extracted state by using a selection model; and
    an identification unit configured to identify a moving object included in the input images by using the selected one or more identification models.

(Supplementary Note 2)

2. The object identification apparatus according to supplementary note 1, wherein
    the foreground extraction unit generates the foreground extraction result with respect to a predetermined number of frames of the input images; and
    the state extraction unit extracts the state of each foreground using the foreground extraction result concerning the predetermined number of frames.

(Supplementary Note 3)

3. The object identification apparatus according to supplementary note 2, wherein the state extraction unit extracts an appearance feature of each foreground included in the predetermined of frames, and outputs the state of each foreground.

(Supplementary Note 4)

4. The object identification apparatus according to supplementary note 3, wherein the state extraction unit extracts respective foreground areas corresponding to the same foreground from the predetermined number of frames, and outputs, as the appearance feature, a feature vector extracted from the predetermined number of frames.

(Supplementary Note 5)

5. The object identification apparatus according to any one of supplementary notes 2 through 4, wherein the state extraction unit extracts a movement trajectory feature of the same foreground through the predetermined number of frames, and outputs the state of each foreground.

(Supplementary Note 6)

6. The object identification apparatus according to supplementary note 5, wherein the state extraction unit extracts the movement trajectory feature including coordinates and a movement amount of the same foreground through the predetermined number of frames, and outputs the extracted movement trajectory feature as the state for each foreground.

(Supplementary Note 7)

7. The object identification apparatus according to any one of supplementary notes 1 through 6, wherein the state extraction unit extracts an area variation of the same foreground from each of the predetermined number of frames, and outputs the state for each foreground.

(Supplementary Note 8)

8. The object identification apparatus according to any one of supplementary notes 1 through 7, wherein the selection model corresponds to a model that is trained to output a likelihood for selecting the identification models to which the state for each foreground is input.

(Supplementary Note 9)

9. The object identification apparatus according to any one of supplementary notes 1 through 8, wherein the identification unit specifies one or more features which the selected identification model uses, from among features included in the state of each foreground, and identify the moving object based on the one or more features.

(Supplementary Note 10)

10. An object identification method comprising:
generating a foreground extract result by performing a foreground extraction with respect to input images;
extracting a state of each foreground based on the foreground extraction result;
selecting one or more identification models based on the extracted state by using a selection model; and
identifying a moving object included in the input images by using the selected one or more identification models.

(Supplementary Note 11)

11. A recording medium storing a program, the program causing a computer to perform a process comprising:
generating a foreground extract result by performing a foreground extraction with respect to input images;
extracting a state of each foreground based on the foreground extraction result;
selecting one or more identification models based on the extracted state by using a selection model; and
identifying a moving object included in the input images by using the selected one or more identification models.

(Supplementary Note 12)

12. A learning apparatus comprising:
a foreground extraction unit configured to perform a foreground extraction with respect to input images, and generate a foreground extraction result;
a state extraction unit configured to extract a state for each foreground by using the foreground extraction result; and
a learning unit configured to train a selection model for selecting one or more identification models of an object based on the state for each foreground and correct answer data prepared in advance.

(Supplementary Note 13)

13. A learning method comprising:
performing a foreground extraction with respect to input images, and generate a foreground extraction result;
extracting a state for each foreground by using the foreground extraction result; and
training a selection model for selecting one or more identification models of an object based on the state for each foreground and correct answer data prepared in advance.

(Supplementary Note 14)

14. A recording medium storing a program, the program causing a computer to perform a process comprising:
performing a foreground extraction with respect to input images, and generate a foreground result;
extracting a state for each foreground by using the foreground extraction result; and
training a selection model for selecting one or more identification models of an object based on the state for each foreground and correct answer data prepared in advance.

While the invention has been described with reference to the example embodiments and examples, the invention is not limited to the above example embodiments and examples. It will be understood by those of ordinary skill in the art that various changes in form and details may be made therein without departing from the spirit and scope of the present invention as defined by the claims.

DESCRIPTION OF SYMBOLS 21, 71 Foreground extraction unit
22, 72 State extraction unit
23 Identification model selection unit
24 Identification unit
25, 74 Foreground extraction model storage unit
26, 75 Selection model storage unit
27 Identification model storage unit
51 Feature extractor
61 Likelihood estimator
73 Selection model learning unit
76 Learning unit

What is claimed is:

1. An object identification apparatus comprising:
a first memory storing instructions; and
one or more first processors configured to execute the instructions to:
perform foreground extraction with respect to input images, and generate a foreground extraction result;
extract a state of a foreground of each input image based on the foreground extraction result, wherein the state includes a movement trajectory feature, an area variation feature, and an appearance feature of the foreground;
select one or more identification models based on the extracted state by using a selection model, wherein the selection model receives the state and outputs a likelihood to select each identification model, and wherein the selection model is trained using correct answer data having a value indicating the identification model to be used to identify a foreground of each of training input images; and
identify a moving object included in the input images by using the selected one or more identification models.

2. The object identification apparatus according to claim 1, wherein
the first processor generates the foreground extraction result with respect to a predetermined number of frames of each of the input images; and
the first processor extracts the state of the foreground of each input image using the foreground extraction result concerning the predetermined number of frames.

3. The object identification apparatus according to claim 2, wherein the first processor extracts an appearance feature of the foreground of each input image included in the predetermined frames, and outputs the state of the foreground of each input image.

4. The object identification apparatus according to claim 3, wherein the first processor extracts respective foreground areas corresponding to a same foreground from the predetermined number of frames, and outputs, as the appearance feature, a feature vector extracted from the predetermined number of frames.

5. The object identification apparatus according to claim 2, wherein the first processor extracts the movement trajectory feature of a same foreground through the predetermined number of frames, and outputs the state of the foreground of each input image.

6. The object identification apparatus according to claim 5, wherein the first processor extracts the movement trajectory feature including coordinates and a movement amount of the same foreground through the predetermined number of frames, and outputs the extracted movement trajectory feature as the state for the foreground of each input image.

7. The object identification apparatus according to claim 1, wherein the first processor extracts the area variation feature of a same foreground from each of the predetermined number of frames, and outputs the state for the foreground of each input image.

8. The object identification apparatus according to claim 1, wherein the selection model is trained to output the likelihood for selecting the identification model for the state for the foreground of each input image.

9. The object identification apparatus according to claim 1, wherein the first processor specifies one or more features which the selected identification model uses, from among features included in the state of the foreground of each input image, and identifies the moving object based on the one or more features.

10. A learning apparatus for use in conjunction with the object identification apparatus according to claim 1, the learning apparatus comprising:
a second memory storing instructions; and
one or more second processors configured to execute the instructions to:
perform the foreground extraction with respect to the training input images, and generate a foreground extraction result;
extract a state for the foreground of each training input image by using the foreground extraction result; and
train the selection model for selecting the one or more identification models of an object based on the state for the foreground of each training input image and the correct answer data prepared in advance.

11. The object identification apparatus according to claim 1, wherein the movement trajectory feature includes coordinates of the foreground for each of a plurality of frames of each input image and a movement amount of the foreground among adjacent frames.

12. The object identification apparatus according to claim 1, wherein the area variation feature indicates a variation ratio for an area of the foreground among adjacent frames of each input image.

13. An object identification method performed by a computer and comprising:
by performing foreground extraction with respect to input images, and generating a foreground extraction result;
extracting a state of a foreground of each input image based on the foreground extraction result, wherein the state includes a movement trajectory feature, an area variation feature, and an appearance feature of the foreground;
selecting one or more identification models based on the extracted state by using a selection model, wherein the selection model receives the state and outputs a likelihood to select each identification model, and wherein the selection model is trained using correct answer data having a value indicating the identification model to be used to identify a foreground of each of training input images; and
identifying a moving object included in the input images by using the selected one or more identification models.

14. A learning method for use in conjunction with the object identification method according to claim 13, the learning method performed by a different computer and comprising:
performing the foreground extraction with respect to the training input images, and generate a foreground extraction result;
extracting a state for the foreground of each training input image by using the foreground extraction result; and
training the selection model for selecting the one or more identification models of an object based on the state for the foreground of each training input image and the correct answer data prepared in advance.

15. A non-transitory computer-readable recording medium storing a program executable by a computer to perform an object identification process comprising:
by performing foreground extraction with respect to input images, and generating a foreground extraction result;
extracting a state of a foreground of each input image based on the foreground extraction result, wherein the state includes a movement trajectory feature, an area variation feature, and an appearance feature of the foreground;
selecting one or more identification models based on the extracted state by using a selection model, wherein the selection model receives the state and outputs a likelihood to select each identification model, and wherein the selection model is trained using correct answer data having a value indicating the identification model to be used to identify a foreground of each of training input images; and
identifying a moving object included in the input images by using the selected one or more identification models.

16. A non-transitory computer-readable recording medium storing a program executable by a different computer to perform a learning process in conjunction with the object identification process according to claim 15, the learning process comprising:
performing the foreground extraction with respect to the training input images, and generate a foreground extraction result;
extracting a state for the foreground of each training input image by using the foreground extraction result; and
training the selection model for selecting the one or more identification models of an object based on the state for the foreground of each training input image and the correct answer data prepared in advance.

* * * * *